US005212813A

United States Patent [19]

Renaud

[11] Patent Number: 5,212,813

[45] Date of Patent: May 18, 1993

[54] DEVICE FOR THE COUPLING TO A COMMON ANTENNA OF AT LEAST TWO TRANSMITTING AND/OR RECEIVING DEVICES

[75] Inventor: Laurent Renaud, Rueil Malmaison, France

[73] Assignee: Dassault Aviation, Paris, France

[21] Appl. No.: 660,845

[22] Filed: Feb. 26, 1991

[30] Foreign Application Priority Data

Feb. 28, 1990 [FR] France ............................ 90 02484

[51] Int. Cl.$^5$ ........................ H04B 1/48; H04B 1/18

[52] U.S. Cl. ................................ 455/82; 455/83; 455/280; 343/858

[58] Field of Search .................... 340/961; 342/45, 49, 342/51; 343/858; 370/38, 37, 30, 32; 333/132, 126, 129; 455/19, 14, 15, 25, 78, 80–82, 83, 132, 280

[56] References Cited

U.S. PATENT DOCUMENTS 3,636,452 1/1972 Nuding .............................. 455/19
3,725,942 4/1973 Ulkmar .............................. 343/858
3,742,506 6/1973 Wikinson ............................ 343/858
4,211,894 7/1980 Watanabe et al. .................... 370/38
4,449,128 5/1984 Weir .................................. 343/858
5,023,866 6/1991 DeMuro ............................ 333/126

FOREIGN PATENT DOCUMENTS 59-72824A 4/1984 Japan .............................. 455/82
59-225622A 12/1984 Japan .............................. 455/82
60-233943A 11/1985 Japan .............................. 455/82

*Primary Examiner*—Reinhard J. Eisenzopf
*Assistant Examiner*—Lisa D. Charouel
*Attorney, Agent, or Firm*—Watson, Cole, Grindle & Watson

[57] ABSTRACT

This device is intended for the coupling to a same antenna of at least two devices for transmitting and/or receiving microwave frequency signals operating in a same frequency range but having separated working bands. It is constituted by a circuit (M) comprising four passive filters ($F_1$–$F_4$) and two circulators ($C_1$, $C_2$) defining four channels for respectively coupling each of the transmitters ($E_A$, $E_B$) and receivers ($R_A$, $R_B$) of the two devices (A, B) to the antenna. Each circulator ($C_1$; $C_2$) is connected by the intermediary of a filter to the transmitter of one of the devices and to the receiver of the other device in order to couple them to the antenna, while isolating them from each other. The invention has an application for coupling transmitting and/or receiving devices installed in aircrafts.

15 Claims, 3 Drawing Sheets

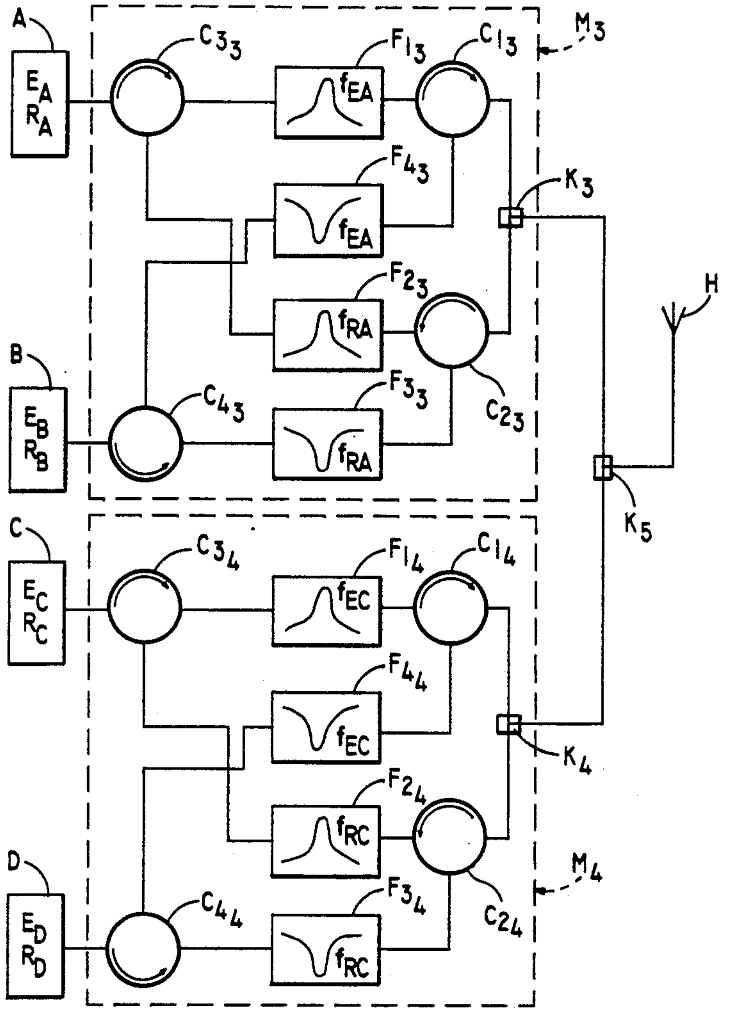
FIG. 5
FIG. 6
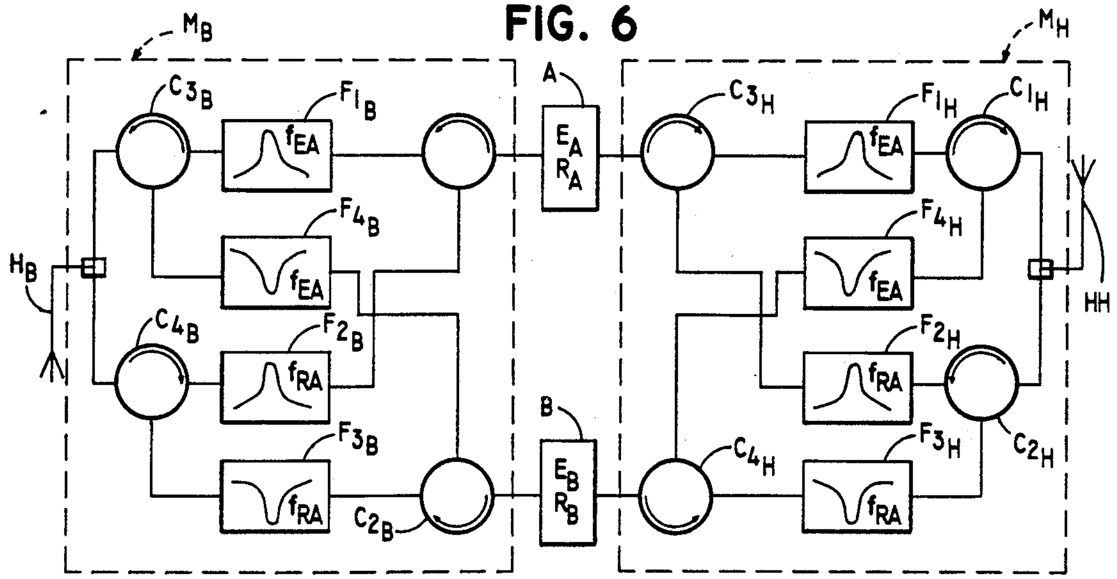

DEVICE FOR THE COUPLING TO A COMMON ANTENNA OF AT LEAST TWO TRANSMITTING AND/OR RECEIVING DEVICES

BACKGROUND OF THE INVENTION

The present invention relates to a device for the coupling to a common antenna of at least two devices for transmitting and/or receiving microwave frequency signals operating in a same frequency range but having separated working bands.

RELATED ART

On a modern aircraft, particularly a combat aircraft, the existence of numerous devices generating and receiving electromagnetic radiations gives rise to the presence of a very large number of antennas.

According to the type of radiation pattern sought, the location of the antennas must be optimized in order to comply with given directivity criteria. Furthermore, the presence of several antennas transmitting or receiving in the same frequency range or band can give rise to undesirable couplings between the different devices. These couplings strongly depend upon the respective positions of the antennas on the aircraft as well as on the shapes of the aircraft.

It is thus that a large number of aircraft are equipped, on the one hand with identification responders (for example IFF: Identification Friend and Foe; ATC: Air Traffic Control) and on the other hand with items of equipment combining telecommunication functions (data transmission with aircraft, ships, ground based systems, etc; for example MIDS: Multifunctional Information Distribution System), and distance measuring functions (DME: Distance Measurement Equipment) or distance and bearing measuring functions (TACAN: Tactical Aid to Navigation) with respect to a beacon located on the ground. The radiation patterns of these two devices must be omni-directional, which results, taking account of the fact that the frequencies are in the same range or band (L band), in the same optimum locations for the antennas. Furthermore, each of these two devices must be coupled to a high antenna and to a low antenna, which gives a total of four antennas on existing aircraft.

Under these conditions, it is appropriate to consider the coupling of the two devices to the same high antenna and the same low antenna, which would allow the number of antennas to be reduced by two and would result in reductions in:

the overall mass of the two items of equipment;

the design time necessary for the installation of the antennas which is often very difficult because of the lack of space available in the cells of the aircraft;

the testing time necessary for ensuring the electromagnetic compatibility between the two devices and for optimizing the radiation patterns of the antennas;

the design cost and the hardware cost of the two items of equipment (devices+antennas); and the radar electromagnetic signature of the aircraft.

Furthermore, such a coupling device will have to guarantee a minimum of interaction between the two devices, improve or at least maintain the performances obtained with two separate radiating devices, be of minimum weight and offer a very high degree of reliability.

SUMMARY OF THE INVENTION

The invention therefore seeks to provide a device for the coupling to a common antenna of at least two devices for transmitting and/or receiving microwave frequency signals operating in a same frequency range but having separated working bands, which allows these objectives to be attained.

For this purpose, the coupling device according to the invention is constituted by a circuit comprising:

a first channel for coupling the transmitter of a first device to the antenna by the intermediary of a first passive filter and of a first circulator, a second channel for coupling the receiver of the first device to the antenna by the intermediary of a second passive filter and of a second circulator, a third channel for coupling the transmitter of the second device to the antenna by the intermediary of a third passive filter and of the second circulator, and a fourth channel for coupling the receiver of the second device to the antenna by the intermediary of a fourth passive filter and of the first circulator, each circulator being connected to the transmitter of one of the devices and to the receiver of the other device in the direction adapted to allow the transmission of signals from the said transmitter to the antenna and from the latter to the said receiver and to inhibit the transmission of signals from the said transmitter to the said receiver.

According to a characteristic of the invention:

the first passive filter is a band pass filter centered on the middle of the working band of the transmitter of the first device, the second passive filter is a band pass filter centered on the middle of the working band of the receiver of the second device, the third passive filter is a band rejection filter centered on the middle of the working band of the receiver of the first device, and the fourth passive filter is a band rejection filter centered on the middle of the working band of the transmitter of the first device.

According to another characteristic, the transmitter and the receiver of the first device have separated working bands.

According to yet another characteristic, the said circuit comprises at least a third circulator having a first terminal intended to be connected to the transmitter and/or to the receiver of one of the devices, a second terminal connected to the channel for connecting the said transmitter to the antenna and a third terminal connected to the channel for connecting the said receiver to the antenna. The circuit can be completed by a fourth circulator connected in a similar manner to the third circulator between the other device and the two other connection channels respectively.

Several four-channel circuits can be connected in cascade for the coupling to a same antenna of several transmitting and/or receiving devices operating in a same microwave frequency range but having separated working bands: the first and fourth filters of each circuit then have a bandwidth covering the working bands of all the transmitters connected to the first channel of this circuit, and the said second and third filters of this same circuit have a bandwidth covering the working bands of all the receivers connected to the second channel of this circuit.

In the case of such a cascade assembly, each circuit is connected to the following circuit on the antenna side by the intermediary of one of the abovementioned third and fourth circulators.

If it is necessary to couple to at least one common antenna several groups of transmitting and/or receiving devices each operating in a microwave frequency range which is distinct from that of the other groups of devices, each group of devices can be directly coupled to the antenna by at least one four-channel circuit.

According to the characteristics of the transmitting and/or receiving devices which are present, it is thus possible to assemble four-channel circuits according to the invention in "series" and/or in "parallel", in the electrical meaning of the expression, in order to constitute complex coupling devices.

Finally, according to a characteristic of the invention, an impedance matching isolator is preferably connected between each filter and each adjacent circulator.

BRIEF DESCRIPTION OF THE DRAWINGS

Other characteristics and advantages of the invention will emerge from the following description of several embodiments given solely by way of examples and illustrated by the appended drawings in which:

FIG. 5 is a block diagram of a device having two elementary circuits connected in parallel for the coupling of two pairs of transmitting and receiving devices to a common antenna.

FIG. 6 is a block diagram of a device having two identical elementary circuits for the coupling of two transmitting/receiving devices to two common antennas.

DETAILED DESCRIPTION

Figure 1:
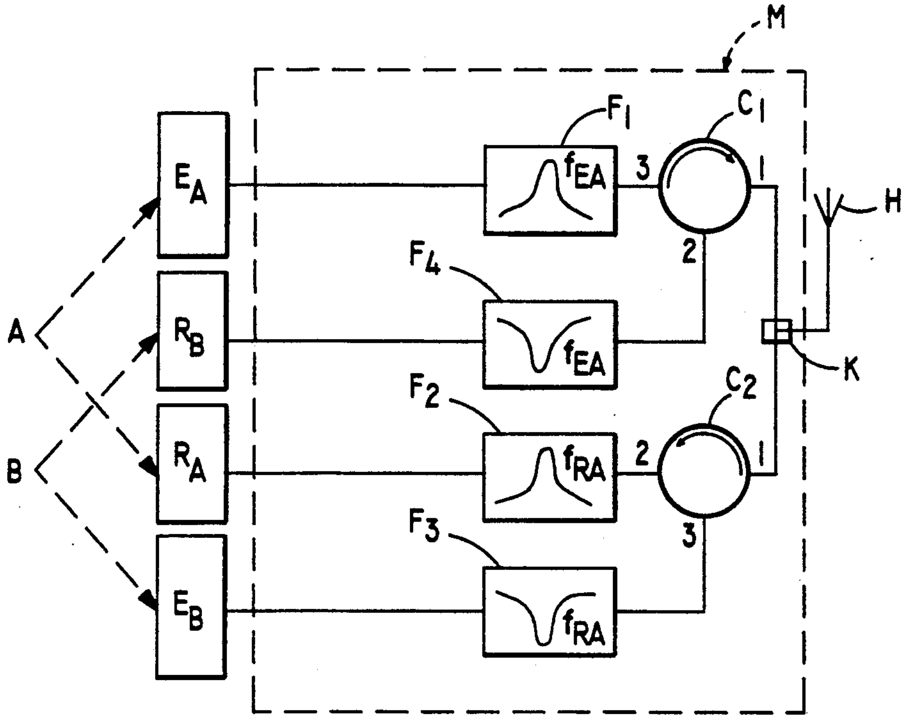
FIG. 1 is a block diagram of a device according to a first embodiment for the coupling to a common antenna of two transmitting and receiving devices.

Referring to FIG. 1, two transmitting/receiving devices A and B are coupled to an antenna H by the intermediary of a coupling circuit M having four channels. The circuit M comprises four passive filters $F_1$, $F_2$, $F_3$, $F_4$ and two circulators $C_1$ and $C_2$ connected to the antenna H by the intermediary of a coupler K.

It will be recalled that an ideal circulator is a circuit having three terminals, in which the signals are transmitted in one direction between two adjacent terminals, but not in the opposite direction. Thus, if the terminals 1, 2 and 3 of the circulators $C_1$ and $C_2$ of FIG. 1 are considered, the signals pass directly from terminal 1 to terminal 2, from terminal 2 to terminal 3 and from terminal 3 to terminal 1. By contrast, the transmission is negligible in the opposite direction, namely from 1 to 3, from 3 to 2, and from 2 to 1. In the figures, the direction of transmission of the circulators is indicated by an arrow.

The transmitter $E_A$ of the device A is coupled to the antenna H by a first channel comprising the passive filter $F_1$ and the connection between the terminals 3 and 1 of the circulator $C_1$. The filter F is a band pass filter centered on the middle $f_{EA}$ of the working band of the transmitter $E_A$.

The receiver $R_A$ of the device A is coupled to the antenna H by a second channel comprising the passive filter $F_2$ and the connection between the terminals 1 and 2 of the second circulator $C_2$. The filter $F_2$ is a band pass filter centered on the middle $f_{RA}$ of the working band of the receiver $R_A$.

The transmitter $E_B$ of the second device B is coupled to the antenna H by a third channel comprising the passive filter $F_3$ and the connection between the terminals 3 and 1 of the second circulator $C_2$. The passive filter $F_3$ is a band rejection filter centered on the middle $f_{RA}$ of the working band of the receiver $R_{RA}$ of the first device A.

Finally, the receiver $R_B$ of the device B is coupled to the antenna H by a fourth channel comprising the passive filter $F_4$ and the connection between the terminals 1 and 2 of the first circulator $C_1$. The filter $F_4$ is a band rejection filter centered on the middle $f_{EA}$ of the working band of the transmitter $E_A$ of the device A.

During operation, the signals produced by the transmitter $E_A$ are transmitted to the antenna H with a negligible attenuation by the intermediary of the filter $F_1$ which attenuates the components of these signals located out of the working band of the transmitter, of the connection between the terminals 3 and 1 of the circulator $C_1$ and of the coupler K. The receiver $R_B$ of the device B is protected from the signals produced by the transmitter $E_A$, on the one hand by the circulator $C_1$ which introduces an attenuation in the order of $-20$ dB between the terminals 3 and 2 and, on the other hand, by the band rejection filter $F_4$ centered precisely on the middle of the working band of the transmitter $E_A$. The signals coming from the transmitter $E_A$ are also transmitted to the receiver $R_A$ by the intermediary of the coupler K and of the passing connection between the terminals 1 and 2 of the circulator $C_2$. However, these signals are strongly attenuated by the band pass filter $F_2$ centered on the middle of the working band of the receiver $R_A$, which is separated from the working band of the transmitter $E_A$. Finally, the transmitter $E_B$ which necessitates less protection, is nevertheless protected from the signals coming from the transmitter $E_A$ by the attenuation in the order of $-20$ dB provided by the reverse connection between the terminals 1 and 3 of the circulator $C_2$.

When the antenna H picks up signals whose frequencies are located in the working band of the receiver $R_A$, they are transmitted to the latter with a negligible attenuation via the coupler K, the circulator $C_2$ and the passive filter $F_2$. The relatively low energy level of the signals thus received is not capable of affecting the transmitters $E_A$ and $E_B$ which, furthermore, are protected by the circulator $C_1$ and the band pass filter $F_1$ in the first case and by the circulator $C_2$ in the second case. The receiver $R_B$ by contrast receives these signals with a negligible attenuation by the intermediary of the coupler K, of the circulator $C_1$ and of the filter $F_4$, but by definition the receiver $R_B$ is not tuned to the receiving frequency of the receiver $R_A$ and this coupling therefore has no disturbing effect.

When the transmitter $E_B$ transmits, it does so in one or more frequency bands which are separated from the working bands of the transmitter $E_A$ and of the receiver $R_A$. In any case, the band rejection filter $F_3$ strongly attenuates the components of those signals which are located in the working band of the receiver $R_A$. The signals located in the working band or bands of the transmitter $E_B$ are therefore transmitted with a negligible attenuation to the antenna H by the intermediary of the filters $F_3$, of the circulator $C_2$ and of the coupler K. The receiver $R_A$ is protected from this transmission by the attenuations provided by the filter $F_3$ in its working band and by the 3-2 connection of the circulator $C_2$. The transmitter $E_A$ does not necessitate particular protection with respect to transmissions from the transmitter $E_B$ since, as previously indicated, the transmitter $E_B$ does not transmit in its working band and since, if there are nevertheless components of transmitted signals located in this band, they will be of a relatively low energy level and will be attenuated by the 1-3 connection of the circulator $C_1$. Finally, there is no particular protection of the receiver $R_B$ with respect to transmissions from the transmitter $E_B$ because the device B is assumed to be of the simplex type, such that it cannot transmit and receive signals simultaneously.

Finally, when the antenna H picks up signals having frequencies located in the working band of the receiver $R_B$, they are transmitted to the latter with a negligible attenuation by the intermediary of the coupler K, of the circulator $C_1$ and of the filter $F_4$. The presence of the latter does not affect the reception of signals by the receiver $R_B$ since it has been seen previously that the working band or bands of the latter are separated from the working band of the transmitter $E_A$ in the middle of which is centered the rejection filter $F_4$. The signals received by the antenna H in the working band or bands of the receiver $R_B$ are not capable of affecting the transmitters $E_A$ and $E_B$. These low-level signals are furthermore attenuated by the reverse connection 1-3 of the circulators $C_1$ and $C_2$. Finally, the receiver $R_A$ is protected from these received signals, on the one hand by the filter $F_2$ which allows only the working band of this receiver to pass and, on the other hand, by the fact that the receiver $R_A$ is not tuned to the receiving frequency or frequencies of the receiver $R_B$.

The circuit M which has just been described therefore allows the coupling to a same antenna of two devices A and B for transmitting and/or receiving microwave frequency signals operating in a same frequency range but having separated working bands. One of the devices, B, must be simplex because the receiver $R_B$ is not protected with respect to the transmissions from the transmitter $E_B$. The other device A can be duplex as described with reference to FIG. 1, the transmitting and receiving frequencies then being distinct. As a variant, the device A can be simplex and, in this case, the transmitting and receiving frequencies can be either distinct or identical. In this second hypothesis, all the filters $F_1$ to $F_4$ are centered on the middle of the working band of the transmitter and of the receiver of the device A.

Figure 2:
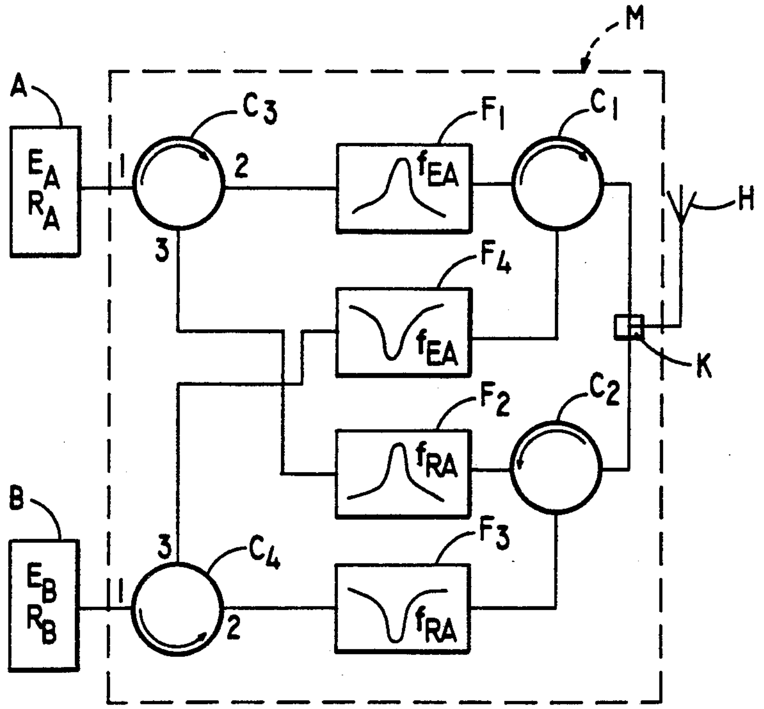
FIG. 2 is a block diagram of a first variant embodiment of the device of FIG. 1.

The block diagram of FIG. 2 shows a variant embodiment in which the circuit M is completed by a third circulator $C_3$ and a fourth circulator $C_4$. The circulator $C_3$ has a first terminal for connection to the device A, a second terminal connected to the filter $F_1$ and a third terminal connected to the filter $F_2$. Similarly, the circulator $C_4$ has a first terminal for connection to the device B, a second terminal connected to the filter $F_3$ and a third terminal connected to the filter $F_4$. The rest of the circuit M of FIG. 2 is absolutely identical to that of FIG. 1.

This variant embodiment is adapted to the case in which the devices A and B have multiplexed transmitting—receiving inputs/outputs, that is to say that they have only one coaxial connection per antenna for ensuring the transmitting and receiving functions. The circulators $C_3$ and $C_4$ then allow the ensuring of the separation between the transmitting and receiving channels. In fact, each of the circulators $C_3$ and $C_4$ ensures the transmission of signals from the transmitter to the corresponding transmitting channel by the intermediacy of the connection between the terminals 1 and 2, and of the receiving channel to the corresponding receiver by the intermediary of the connection between the terminals 3 and 1.

In this embodiment, the device B can also be duplex: it suffices to provide a conventional duplexing filter (not shown) between the transmitting-receiving device and the device (not shown) for coupling the circulator $C_4$ to the terminal 1.

This second embodiment is also appropriate to the cascade or "series" assembly of several circuits M as will be explained below.

Figure 3:
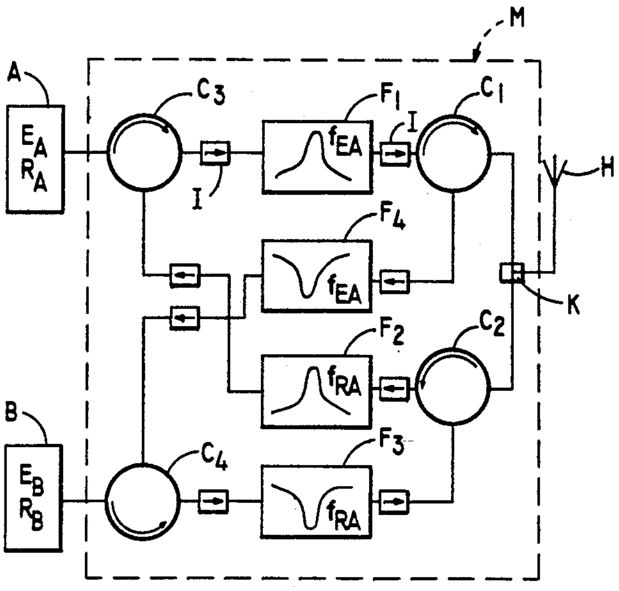
FIG. 3 is a view of the coupling device of FIG. 2 furthermore equipped with isolators.

Preferably, as shown in FIG. 3, microwave frequency isolators I can be connected between each of the filters $F_1$, $F_2$, $F_3$, $F_4$ and the adjacent circulator $C_1$, $C_2$, $C_3$, $C_4$. Each of these isolators I can be constituted by a circulator connected in the desired direction by two of its terminals between a filter and an adjacent circulator and whose third terminal is connected to a microwave frequency energy dissipating load.

In fact a significant loss of efficiency of microwave frequency components occurs when several of them are placed in series, the overall performance being markedly inferior, or even totally different, from that expected. This degradation is due to the fact that although the impedance of a filter is rather well controlled in its pass band (generally in the order of 50 ohms), the impedance out of this band varies in a rather uncontrollable manner. It is therefore appropriate to maintain, seen from the exterior (namely the items of equipment and/or components located upstream and downstream of the filters), the "seen" impedance as close as possible to the characteristic impedance for which these items of equipment and/or components were designed.

The microwave frequency isolators I of FIG. 3, even though they slightly increase the transmission losses and render the filters $F_1$ to $F_4$ directional, allow:

- the protection of the components located downstream of each filter (in the direction of transmission) from variations in the input impedance of the filter;
- the protection of the output of the filter from variations in the impedance of the components located upstream (in the direction of transmission).

Depending on the required performances of the circuit M, the latter will be able to comprise all of the isolators shown in FIG. 3 or only some of the latter.

By way of example, the circuit M which has just been described allows the coupling, to an aircraft's common antenna, of an identification responder (IFF, ATC) and an item of data transmission equipment and/or an item of equipment for measuring distance and possibly bearing with respect to a beacon on the ground (MIDS, TACAN, DME). In practice, on an aircraft, each of these two devices is coupled to a high antenna and a low antenna, but in order to simplify the description only one antenna will be considered, it being understood that two identical circuits allow the coupling of the two devices to two common antennas as will be described with reference to FIG. 6.

The IFF, ATC responder (device A) can be modeled by a 1030 MHz generator having a power of 57 dBm (decibels/milliwatt) energizing the antenna and by a 1090 MHz receiver having a sensitivity of −74 dBm energized by the antenna.

The MIDS, TACAN, DME assembly (device B) can be modeled by a generator having a power of 53 dBm energizing the antenna and a receiver having a sensitivity of −60 dBm energized by the antenna, this transmitter ($E_B$) and this receiver ($R_B$) operating in several working bands located in the same microwave frequency range (L band) as the IFF, ATC responder, to the exclusion of bands centered on 1030 and 1090 MHz.

Under these conditions, the filters $F_1$ and $F_4$ are centered on 1090 MHz and the filters $F_2$ and $F_3$ on 1030 Mhz.

The compatibility between the MIDS, TACAN, DME transmitter ($E_B$) and the receiver of the responder ($R_A$) raises the following problems: in practice, the transmission of the MIDS, TACAN, DME in the receiving band of the IFF, ATC responder is a minimum of −42 dBm/KHz, that is to say of −10 dBm for 1.5 MHz. The sensitivity of the receiver ($R_A$) of the IFF, ATC responder is −74 dBm in a band of width 1.5 MHz. The power necessary for the destruction of the IFF, ATC responder being 30 dBm, it appears that it is not necessary to protect the latter from destruction by the transmitter $E_B$ of the MIDS, TACAN, DME equipment.

By contrast, it is appropriate to ensure a minimum decoupling of −64 dBm between the MIDS, TACAN, DME transmitter ($E_B$) and the IFF, ATC receiver ($R_A$): this decoupling is ensured by the band rejection filter $F_4$ centered at 1030 MHz and the circulator $C_2$ which, together, ensure an attenuation in the order of 80 dBm in a band of 1.5 MHz centered at 1030 MHz.

Compatibility between the IFF, ATC transmitter ($E_A$) and the MIDS, TACAN, DME receiver ($R_B$): in practice, the power of the transmissions from the IFF, ATC responder in the bands allocated to the MIDS, TACAN, DME equipment is −3 dBm. The sensitivity of the MIDS, TACAN, DME receiver ($R_B$) being able to be evaluated at approximately −60 dBm, the decoupling between the IFF, ATC transmitter ($E_A$) and the MIDS, TACAN, DME receiver ($R_B$) is ensured by the circulator $C_1$ (−20 dBm) and the band rejection filter $F_4$ centered at 1090 MHz (−50 dBm) that is to say a total attenuation of −70 dBm in the working band of the IFF, ATC transmitter ($E_A$).

The abovementioned decouplings can be obtained by means of usual microwave frequency filters and circulators, for example interdigitated technology filters from the FILTRONIC Company and TDK circulators of the CU10NA type centered at 1000 MHz and having a bandwidth of approximately 6% with respect to the central frequency.

The coupling circuit M which has been described can be used for coupling more than two transmitting and/or receiving devices to a same antenna H.

Figure 4:
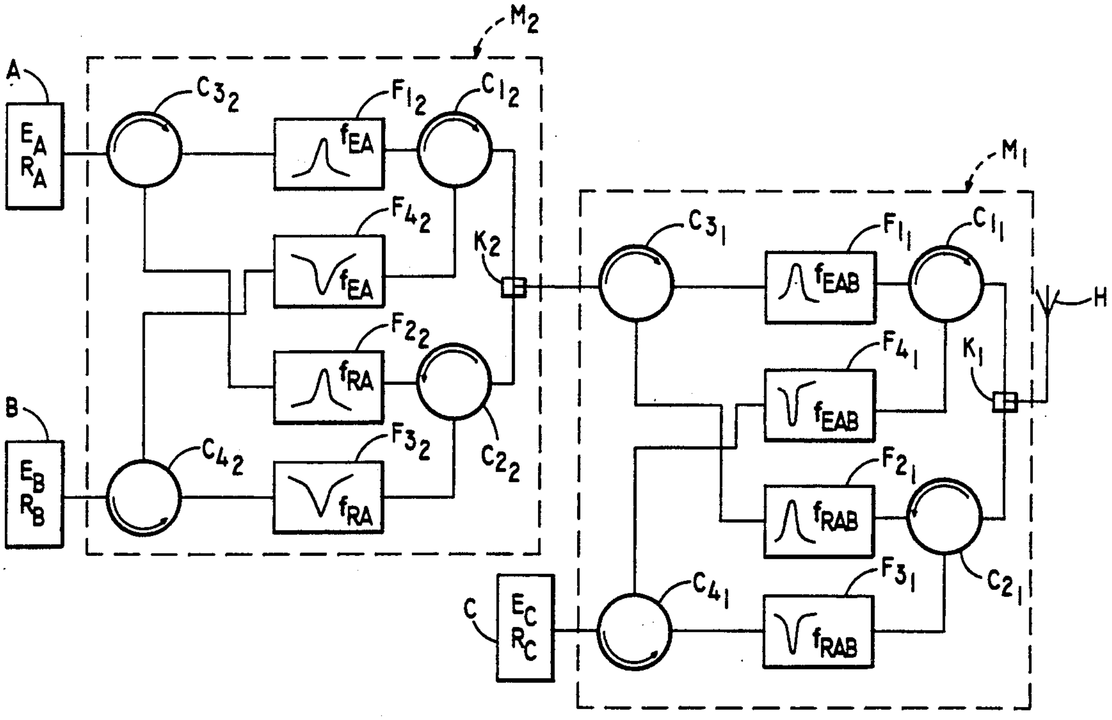
FIG. 4 is a block diagram of a device having two elementary circuits connected in series for ensuring the coupling of three transmitting/receiving devices to a common antenna.

It is thus that FIG. 4 illustrates the coupling of three devices A, B and C to a same antenna H by means of two circuits $M_1$ and $M_2$ assembled in cascade or "series". The circuits $M_1$ and $M_2$ are identical to the circuit M of FIG. 2, and just as for the devices of FIGS. 5 and 6 which will be described hereafter, they can be equipped with the isolators I described with reference to FIG. 3, these isolators not having been shown in FIGS. 4 to 6 for the purpose of clarity.

The coupling device of FIG. 4 can be used in the case in which the transmitters and receivers of the devices A, B and C operate in a same microwave frequency range but have separated working bands. Furthermore, the assembly of FIG. 4 assumes that the device C neither transmits nor receives at frequencies included between the working bands of the transmitters $E_A$ and $E_B$ and between the working bands of the receivers $R_A$ and $R_B$.

The filters of the circuit $M_2$ have characteristics which depend on the devices A and B as described with reference to FIGS. 1 to 3 and the same references assigned with the index 2 have been used to denote the same components. The circulators $C_{12}$ and $C_{22}$ of the circuit $M_2$ are coupled to the circulator $C_{31}$ of the circuit $M_1$ by the intermediary of the coupler $K_2$. Seen from the circuit $M_1$, the circuit $M_2$ appears as the combination of a transmitter having a working band covering the working bands of the transmitters $E_A$ and $E_B$ and of a receiver having a working band covering the working bands of the receivers $R_A$ and $R_B$. The band pass filters $F_{11}$ and $F_{21}$ and the band rejection filters $F_{31}$ and $F_{41}$ therefore have characteristics (central frequency, bandwidth) which depend upon the overall transmitting and receiving bands of the circuit $M_2$.

The block diagram of FIG. 4 is of course only one example from among other numerous possibilities of assembly in cascade of several circuits M. It should be noted that at the end of the system, that is to say on the side of the devices A and B, the presence of third and fourth circulators $C_{32}$ and $C_{42}$ is necessary only if the transmitting and receiving inputs/outputs of the devices A and B are multiplexed. In the opposite case, the circuit $M_2$ can assume the form of the circuit M of FIG. 1. Furthermore, if the device C is capable of transmitting and/or receiving at frequencies included between the working bands of the transmitters $E_A$ and $E_B$ and/or between the working bands of the receivers $R_A$ and $R_B$, it is possible to make use of another type of assembly consisting in connecting one of the devices A or B to the circulator $C_{31}$ and in coupling the device C and the other device A or B to the other circulator $C_{41}$ of the circuit $M_1$ by the intermediary of a second circuit $M_2$.

In brief, the modular nature of the circuit M according to the invention allows the production of a large number of configurations depending on the transmitting and receiving characteristics of the various devices, the principal limitation to the multiplication of the number of devices coupled to a same antenna being due to the attenuations introduced into the signals transmitted by the cascade placement of several circuits and to the necessity of having transmitting and/or receiving devices whose working bands are separated from those of the other transmitting and/or receiving devices.

As shown in FIG. 5, it is also possible to couple in parallel to a same antenna several groups of transmitting and/or receiving devices each of which operates in a microwave frequency range which is distinct from that of the other groups of devices. It is thus that the devices A and B coupled to the antenna H by the circuit $M_3$ operate in a first frequency range and that the circuits C and D coupled to the antenna H by the circuit $M_4$ operate in a second frequency range which is distinct from the first. A common coupler $K_5$ allows the coupling to the antenna H of the couplers $K_3$ and $K_4$ of the circuits $M_3$ and $M_4$ respectively.

This parallel assembly can of course be extended to more than two groups of devices and can be combined with the cascade assembly described with reference to FIG. 4 when a group includes more than two devices operating in a same frequency range.

If necessary an additional decoupling can be provided between the various groups of devices by means of band pass filters, having wide bands, connected between the coupler $K_5$ and each of the couplers $K_3$, $K_4$ of the adjacent circuits $M_3$, $M_4$.

FIG. 6 illustrates the coupling of two transmitting and receiving devices A and B to two common antennas $H_H$ and $H_B$. The coupling with the antenna $H_H$ is ensured by a circuit $M_H$ and that with the antenna $H_B$ by a circuit $M_B$. These circuits have the same configuration as the one in FIG. 2 but they can of course be of the type shown in FIG. 1 if the transmitting and receiving inputs/outputs of the devices A and 8 are not multiplexed. If the transmitting and receiving characteristics to and from each of the two antennas $H_H$ and $H_B$ are identical, the circuits $M_H$ and $M_B$ are also identical.

From the above it emerges that the coupling device according to the invention offers a particularly advantageous solution for coupling, on an aircraft, several transmitting and/or receiving devices to a same antenna. As has been explained, this in fact results in reductions in mass, cost (hardware, design, tests) and in design and testing time. The radar electromagnetic signature of the aircraft can be reduced by it and its aerodynamic characteristics improved if the reduction in the number of antennas allows, with respect to a conventional solution with separate antennas, the optimization of the design of the cell.

It is also very important to note that the coupling circuit according to the invention makes use only of purely passive components which offer very high reliability. This is an essential characteristic of the invention because a coupling device which would make use of active components would not be capable of guaranteeing the required degree of reliability, particularly on modern combat aircraft. The exclusive use of passive components furthermore allows the envisaging of a degraded operation of the coupling circuit, which would be particularly difficult to implement with active components, and allows a considerable facilitation of diagnostics in cases of component failure.

It is self-explanatory that the embodiments described are only examples and that they could be modified, in particular by substitution of equivalent techniques, without by so doing departing from the scope of the invention.

I claim:

1. Device for the coupling to at least one common antenna of at least two devices for transmitting and receiving microwave frequency signals operating in a same frequency range but having separated working bands, a four-channel circuit comprising:

- a first channel for coupling a transmitter of a first device to the antenna by the intermediary of a first passive filter and of a first circulator,
- a second channel for coupling a receiver of said first device to the antenna by the intermediary of a second passive filter and of a second circulator,
- a third channel for coupling a transmitter of a second device to the antenna by the intermediary of a third passive filter and of said second circulator, and
- a fourth channel for coupling a receiver of said second device to the antenna by the intermediary of a fourth passive filter and of said first circulator, said first passive filter is a band pass filter centered on the middle of the working band of said transmitter of said first device;

said second passive filter is a band pass filter centered on the middle of the working band of said receiver of said first device;

said third passive filter is a band rejection filter centered on the middle of the working band of said receiver of said first device;

said fourth passive filter is a band rejection filter centered on the middle of the working band of said receiver of said first device;

each circulator being connected to the transmitter of one of said devices and to the receiver of the other of said devices to allow the transmission of signals from said transmitter of one of said devices to the antenna and from the latter to said receiver of said other of said devices and to inhibit the transmission of signals from said transmitter of said one of said devices to said receiver of said other of said devices.

2. Device according to claim 1, wherein the transmitter and the receiver of the first device have separated working bands.

3. Device according to claim 2, wherein said circuit comprises at least a third circulator having a first terminal for the connection thereof to the transmitter and to the receiver of one of said devices, a second terminal connected to one of said first and third channels for coupling said transmitter of said one of said devices to the antenna and a third terminal connected to one of said second and fourth channels for coupling said receiver of said one of said devices to the antenna.

4. Device according to claim 2, wherein said circuit comprises several four-channel circuits connected in cascade for the coupling to the common antenna of several transmitting and receiving devices operating in a same microwave frequency range but having separated working bands, said first and fourth filter of each circuit having a bandwidth covering the working bands of all the transmitters connected to the first channel of said circuit, and said second and third filters of said circuit having a bandwidth covering the working bands of all the receivers connected to said second channel of said circuit.

5. Device according to claim 1, wherein said circuit comprises at least a third circulator having a first terminal for the connection thereof to the transmitter and to the receiver of one of said devices, a second terminal connected to one of said first and third channels for coupling said transmitter of one of said devices to said antenna and a third terminal connected to one of said second and fourth channels for coupling said receiver of one of said devices to said antenna.

6. Device according to claim 5, wherein said circuit comprises a fourth circulator having a first terminal for the connection thereof to the transmitter and to the receiver of the other of said devices, a second terminal connected to the other of said first and third channels for coupling said transmitter of said other of said devices to said antenna and a third terminal connected to the other of said second and fourth channels for coupling said receiver of said other of said devices to the antenna.

7. Device according to claim 6, further comprising several four-channel circuits connected in cascade for the coupling to said antenna of several transmitting and receiving devices operating in the same microwave frequency range but having separated working bands, said first and fourth filters of each circuit having a bandwidth covering the working bands of all the transmitters connected to the first channel of said circuit, and said second and third filters of said circuit having a bandwidth covering the working bands of all the receivers connected to the second channel of said circuit.

8. Device according to claim 7 wherein each circuit connected to the antenna through another circuit is connected to said another circuit by the intermediary of one of said third and fourth circulators.

9. Device according to claim 8 for the coupling to said common antenna of several groups of transmitting and receiving devices each operating in a microwave frequency range which is distinct from that of the other groups of the devices, wherein each group of devices is directly coupled to said antenna by at least one of said several four-channel circuits.

10. Device according to claim 5, wherein said circuit comprises several four-channel circuits connected in cascade for the coupling to said antenna of several transmitting and receiving devices operating in the same microwave frequency range but having separated working bands, said first and fourth filters of each circuit having a bandwidth covering the working bands of all the transmitters connected to the first channel of said circuit, and said second and third filters of said circuit having a bandwidth covering the working bands of all the receivers connected to said second channel of said circuit.

11. Device according to claim 10, wherein each circuit connected to the antenna through another circuit is connected to said another circuit by the intermediary of said third circulator.

12. Device according to claim 11 for the coupling to said common antenna of several groups of transmitting and receiving devices each operating in a microwave frequency range which is distinct from that of the other groups of devices, wherein each group of devices is directly coupled to said antenna by at least one of said several four-channel circuits.

13. Device according to claim 1, wherein said circuit comprises several four-channel circuits connected in cascade for the coupling to said antenna of several transmitting and receiving devices operating in a same microwave frequency range but having separated working bands, said first and fourth filters of each circuit having a bandwidth covering the working bands of all the transmitters connected to the first channel of said circuit, and said second and third filters of said circuit having a bandwidth covering the working bands of all the receivers connected to said second channel of said circuit.

14. Device according to claim 1 for the coupling to said common antenna of several groups of transmitting and receiving devices each operating in a microwave frequency range distinct from that of the other groups of devices, wherein each group of devices is directly coupled to said antenna by at least one four channel circuits.

15. Device according to claim 1, wherein each connection between said filters and said circulators comprises an impedance matching isolator.

* * * * *